(12) United States Patent
Bostick et al.

(10) Patent No.: US 10,452,150 B2
(45) Date of Patent: Oct. 22, 2019

(54) ELECTRONIC MAP AUGMENTATION THROUGH POINTING GESTURES BACKGROUND

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 15/415,285

(22) Filed: Jan. 25, 2017

(65) Prior Publication Data

US 2018/0210555 A1 Jul. 26, 2018

(51) Int. Cl.
*G06F 3/01* (2006.01)
*G06F 1/16* (2006.01)
*G06F 3/0346* (2013.01)
*G06F 3/0481* (2013.01)

(52) U.S. Cl.
CPC .............. *G06F 3/017* (2013.01); *G06F 1/163* (2013.01); *G06F 3/0346* (2013.01); *G06F 3/04817* (2013.01)

(58) Field of Classification Search
CPC .... G01C 21/20; G01C 21/3664; G01C 21/32; G06F 1/1626; G06F 1/163; G06F 1/1694; G06F 3/017; G06F 3/0346; G06F 3/04817; G06F 3/04883; G06F 2200/1637; G06Q 30/02; H04W 4/023; H04W 4/026; H04W 4/043; H04W 4/21
See application file for complete search history.

(56) References Cited

U.S. PATENT DOCUMENTS

| | | | |
|---|---|---|---|
| 9,253,616 B1 | 2/2016 | Haney | |
| 9,686,645 B2* | 6/2017 | Shan | ........................ H04W 4/02 |
| 2006/0256008 A1* | 11/2006 | Rosenberg | ............. G01C 21/20 342/367 |
| 2007/0273558 A1 | 11/2007 | Smith et al. | |
| 2007/0273583 A1* | 11/2007 | Rosenberg | ............ H04W 8/005 342/367 |
| 2009/0221374 A1* | 9/2009 | Yen | ......................... A63F 13/06 463/42 |
| 2009/0319181 A1* | 12/2009 | Khosravy | .............. G01C 21/20 701/532 |
| 2011/0154266 A1* | 6/2011 | Friend | ..................... A63F 13/06 715/863 |

(Continued)

FOREIGN PATENT DOCUMENTS

CN 103558918 A 2/2014
CN 203909487 U 10/2014

*Primary Examiner* — Bryan Earles
(74) *Attorney, Agent, or Firm* — Yee & Associates, P.C.; Brian Restauro (57) ABSTRACT

A computer-implemented method, system and computer program product for augmenting an electronic map with pointing gestures are provided. The computer-implemented method, system and computer program product display an electronic map of a current location of a user of the electronic map, receive an indication that a person is gesturing, and augment the electronic map by displaying an area toward which the person is gesturing on the electronic map.

19 Claims, 9 Drawing Sheets

(56) References Cited

U.S. PATENT DOCUMENTS

| | | | |
|---|---|---|---|
| 2014/0368424 A1 | 12/2014 | Choi et al. | |
| 2015/0148072 A1* | 5/2015 | Snyder | H04W 4/025 455/456.2 |
| 2015/0346932 A1* | 12/2015 | Nuthulapati | G06F 3/017 715/704 |
| 2018/0073889 A1* | 3/2018 | Vigilante | G01C 21/20 |

* cited by examiner

ELECTRONIC MAP AUGMENTATION THROUGH POINTING GESTURES

BACKGROUND

BACKGROUND

1. Field

The present disclosure relates to electronic maps, and more particularly, to a computer-implemented method, system and computer program product for augmenting electronic maps through pointing gestures.

2. Description of the Related Art

Map augmentation is the superimposition of a user's view of reality atop a computer-generated (i.e., electronic) map, thus creating a composite view rooted in both real and virtual worlds. One example of map augmentation is a "You Are Here!" feature of Global Positioning System or GPS-enhanced electronic maps. This feature enables a user to know exactly where on an electronic map the user is currently located. Another example of a map augmentation is the display of a user's orientation on an electronic map, such that the user is able to determine at a glance which direction on the map the user is facing.

There may be times when other map augmentations may be needed. For example, at times, an electronic map user may be surrounded by friends. In such cases, the user may be scrutinizing points of interest on the electronic map of a local area while his/her friends may be interested in sites or points of interest in the horizon. When that occurs, the user may not be aware of the sites or points of interest in which his/her friends are interested.

Hence, there is a need to augment an electronic map being used by a user to include sites or points of interest in the distance in which other users of the electronic map may be interested.

SUMMARY

The present disclosure provides a computer-implemented method, system and computer program product for augmenting an electronic map with pointing gestures. The computer-implemented method, system and computer program product display an electronic map of a current location of a user of the electronic map, receive an indication that a person is gesturing, and augment the electronic map by displaying an area toward which the person is gesturing on the electronic map.

DETAILED DESCRIPTION

The present disclosure adds further augmentation to electronic maps. In accordance with the disclosure, the augmentation includes displaying, on an electronic map, an area in the distance to which a person is pointing.

The present disclosure will be explained using a smart watch and a cellular (cell) phone as a mobile device onto which an electronic map may be displayed. However, the disclosure is not thus restricted. For example, any electronic device that is capable of displaying an electronic map is well within the realm of the disclosure. Further, any electronic device that a user may wear, which may detect pointing gestures is also within the realm of the disclosure. Thus, the use of the cell phone and smart watch is only for illustrative purposes.

Figure 1:
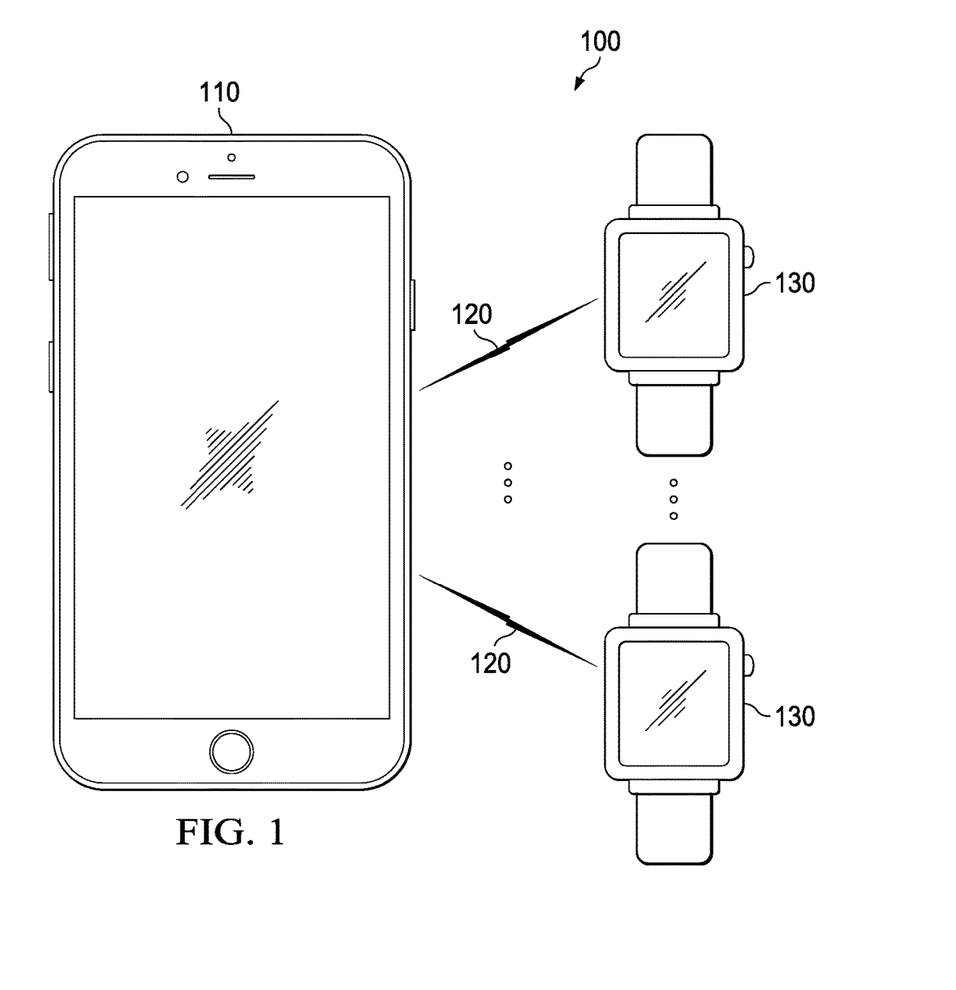
FIG. 1 is a pictorial representation of a network of mobile devices in accordance with an illustrative embodiment.

With reference now to the figures, FIG. 1 depicts a pictorial representation of a network of mobile devices 100 in accordance with an illustrative embodiment. Network of mobile devices 100 includes cell phone 110 and a plurality of smart watches 130. Each smart watch 130 is connected to cell phone 110 via a network connection 120. Network connection 120 may be a near field communication (NFC) connection, a Bluetooth connection, a Wi-Fi connection, an ultrasound connection or other suitable types of connection. For example, if cell phone 110 and a smart watch 130 are in close proximity to each other (i.e., touching distance of each other), then network connection 120 may be an NFC connection. If, on the other hand, cell phone 110 and a smart watch 130 are within 10 meters of each other, then network connection 120 may be a Bluetooth connection. In another example, if cell phone 110 and another smart watch 130 are somewhat further away, but within Wi-Fi range of each other (e.g., within 100 meters of each other), then network connection 120 may be a Wi-Fi peer-to-peer connection. This type of connection does not require a Wi-Fi router to be present, and the two devices will find each other and communicate directly. Further, if cell phone 110 and yet another smart watch 130 are on the same local area network (LAN) (e.g., connected to the same Wi-Fi router), even if they are not themselves within range of each other, then network connection 120 may be through a (conventional) Wi-Fi connection. In addition, if cell phone 110 is connected to a cell network while a particular smart watch 130 is connected either to a Wi-Fi and/or a cell network for instance, then network connection 120 may be a wide area network (WAN) connection, such as the Internet.

In certain occasions, network connection 120 may be an ultrasound connection. In such cases, either cell phone 110 or a smart watch 130 may request an ultrasound connection from the other by emitting an ultrasonic sound through a speaker. The sound is then picked up by a microphone in the other device, which allows for the two devices to pair up with each other.

Note that a network connection 120 may go from one type to another. For example, if cell phone 110 initially established a Bluetooth connection with a smart watch 130 and if the distance between cell phone 110 and the smart watch 130 becomes too large to sustain the Bluetooth connection, then the connection may automatically switch from Bluetooth to Wi-Fi peer-to-peer, for example, so long as the distance between the two mobile devices is within the range for that type of connection.

As can be surmised from the explanation above, although network connection 120 is indicated as a single component for simplicity, it is appreciated that network connection 120 can comprise one or more direct connections to other devices, as well as a more complex set of interconnections as can exist within a WAN or the Internet.

Figure 2:
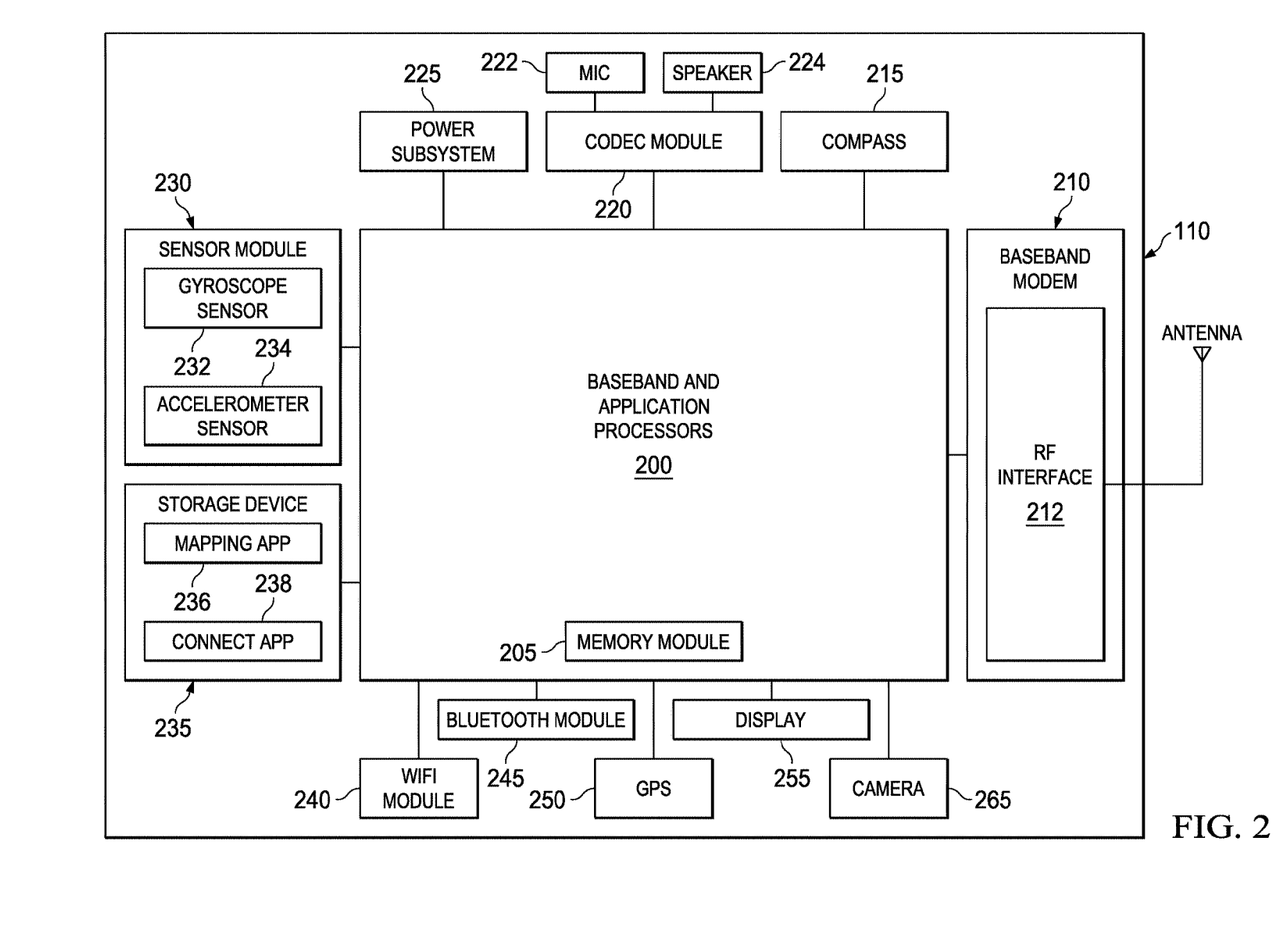
FIG. 2 is a block diagram of a cell phone used as a mobile device in accordance with an illustrative embodiment.

FIG. 2 depicts a block diagram of the cell phone used as a mobile device in accordance with an illustrative embodiment. The cell phone may be cell phone 110 of FIG. 1. As shown, cell phone 110 includes baseband and application processors 200 having memory module 205 coupled thereto. Further coupled to baseband and application processors 200, is baseband modem 210 for sending and receiving voice communications. Baseband modem 210 includes radio frequency (RF) interface 212 that is connected to an antenna. Power subsystem 225 powers cell phone 110.

Cell phone 110 also includes compass 215 for detecting in which direction on a map cell phone 110 is facing, and Global Positioning System (GPS) receiver 250 for determining where on the map cell phone 110 is located. Cell phone 110 may further include sensor module 230 which may include accelerometer sensor 234 and gyroscope sensor 232. Accelerometer sensor 234 may be used to measure acceleration in the 3-dimensional coordinate system and gyroscope sensor 232 may be used to measure orientation changes (or angular velocity). The two sensors may be used to determine whether cell phone 110 is tilted and in what direction, and other types of information about cell phone 110.

In addition, cell phone 110 may include storage device 235 into which may be stored mapping application 236 and connect application 238. Mapping application 236 may be used for displaying a map of the current location of cell phone 110 on display 255. Connect application 238 may be used to request connection with nearby smart watches 130.

Cell phone 110 may further include camera 265 to capture photographs and record video clips and CODEC module 220 having integrated mic 222 and speaker 224. Mic 222 and speaker 224 may be used, among other functions, for ultrasonic communications. For Wi-Fi communications, cell phone 110 may use Wi-Fi module 240 whereas cell phone 110 may use Bluetooth module 245 for Bluetooth communications.

Figure 3:
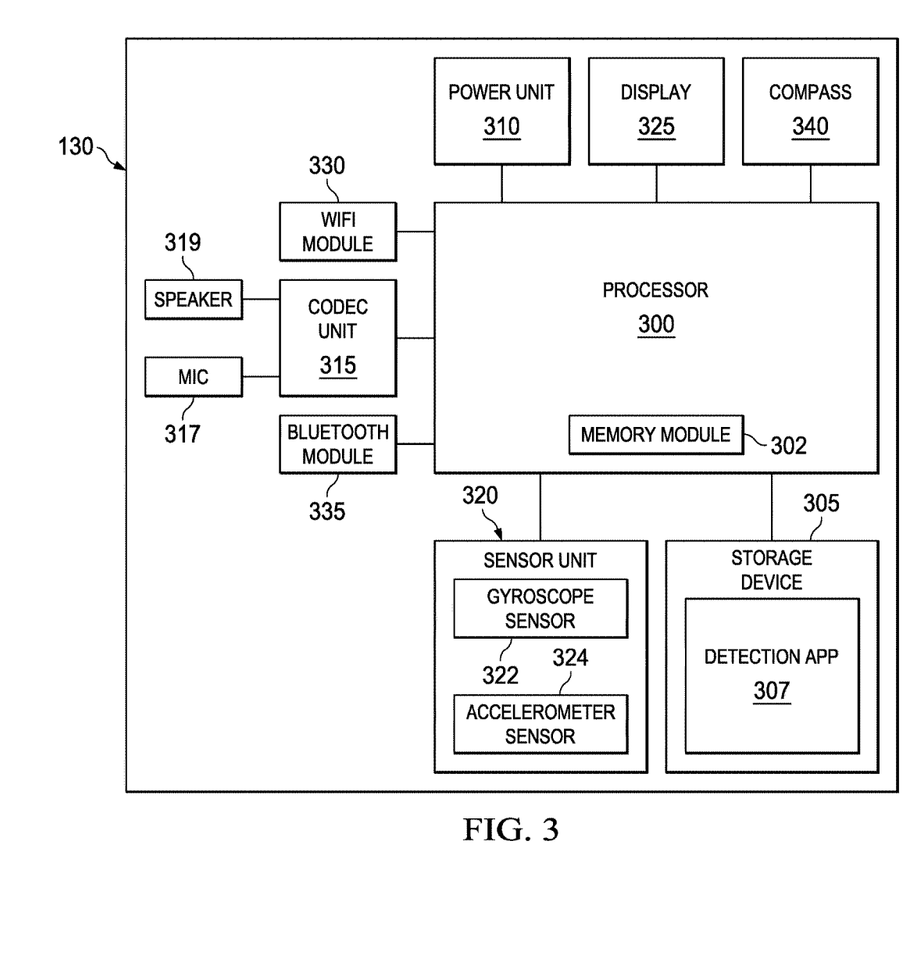
FIG. 3 is a block diagram of a smart watch used as a mobile device in accordance with an illustrative embodiment.

FIG. 3 depicts a block diagram of a smart watch used as a mobile device in accordance with an illustrative embodiment. The smart watch may be a smart watch 130 of FIG. 1. Smart watch 130 is powered by power unit 310 and includes processor 300 and memory module 302. Coupled to processor 300 is compass 340 which may be used for detecting in which direction an arm wearing smart watch 130 is facing. Smart watch 130 may include sensor unit 320, which may contain accelerometer sensor 324 and gyroscope sensor 322. As in the case of accelerometer sensor 234 and gyroscope sensor 232 of FIG. 2, accelerometer sensor 324 may be used to measure the acceleration of smart watch 130 in the 3-dimensional coordinate system and gyroscope sensor 322 may be used to measure orientation changes of smart watch 130. Hence, when the arm wearing smart watch 130 moves from a position of rest, gyroscope sensor 322 may measure the angle of displacement (i.e., how far away from the position of rest has the arm moved) and accelerometer sensor 324 may measure the speed at which the arm has moved from the position of rest. This then allows smart watch 130 to determine when the arm wearing smart watch 130 is raised and to which extent the arm is raised.

Smart watch 130 may also include storage device 305 within which detection application 307 may be stored. Detection application 307 may be used to initiate detection of pointing gestures made by a person wearing smart watch 130. Further, smart watch 130 may include CODEC unit 315 having an integrated mic 317 and speaker 319 for conducting ultrasonic communications, as an example. As in the case of cell phone 110, smart watch 130 may include Wi-Fi module 330 for Wi-Fi communications and Bluetooth module 335 for Bluetooth communications. In addition, smart watch 130 may include display 325. Display 325 may output an image based on content processed by processor 300 or based on control instructions from processor 300.

Note that memory module 205 and storage device 235 of FIG. 2 and memory module 302 and storage device 305 of FIG. 3 may include various digital data storage spaces, such as a flash memory, Random Access Memory (RAM), Read-Only-memory (ROM), Solid Stage Drive (SSD), and other suitable types of storage media.

In accordance with an embodiment of the disclosure, a user with cell phone 110 may launch connect application 238 of FIG. 2. In response to the launch of connect application 238, cell phone 110 may request permission to establish connection with nearby smart watches 130. The connection may be a paired connection. In this case, a smart watch 130 and cell phone 110 are paired by the smart watch 130 entering pairing mode and sending a pairing signal, and cell phone 110 connecting to the pairing signal or vice versa. A paired connection may use technologies such as Bluetooth or Wi-Fi peer-to-peer etc.

Alternatively, the connection may be a broadcast/listen connection. In this instance, a broadcast communication can be sent from cell phone 110 to all nearby smart watches 130. Each nearby smart watch 130 may, in response, establish a connection with cell phone 110. Technologies such as ultrasound may be used. In an ultrasonic communication, smart watch 130 may emit an ultrasonic message using speaker 319 of FIG. 3. Cell phone 110 may receive the ultrasonic message by listening on microphone 222 of FIG. 2.

Returning to FIG. 2, when the user launches mapping application 236, mapping application 236 renders a map on display 255 onto which is shown the current location of cell phone 110 as determined by GPS receiver 250. The orientation of which way on the map the user holding cell phone 110 is facing, is determined by compass 215. Note that accelerometer sensor 234 and gyroscope sensor 232 may also be used in determining the orientation of cell phone 110. After mapping application 236 is launched and if cell phone 110 is connected to at least one smart watch 130, cell phone 110 then sends a signal to the at least one smart watch 130 to inform the watch that the mapping application 236 has been launched. Upon receiving the signal, each connected smart watch 130 launches detection application 307 of FIG.

3, for detecting pointing gestures from the person wearing smart watch 130. As a result, when a person wearing smart watch 130 issues a pointing gesture, the nature of the gesture will be analyzed as explained below. Note that, pointing gesture detection occurs by monitoring accelerometer sensor 324 and gyroscope sensor 322 of smart watch 130 to detect when a user raises his or her arm.

When a pointing gesture is detected, two forms of analysis are performed. One analysis is performed to determine the direction of the pointing gesture. As mentioned above, this analysis uses compass 340 to obtain a compass reading in degrees or otherwise of the pointing gesture.

Figure 4:
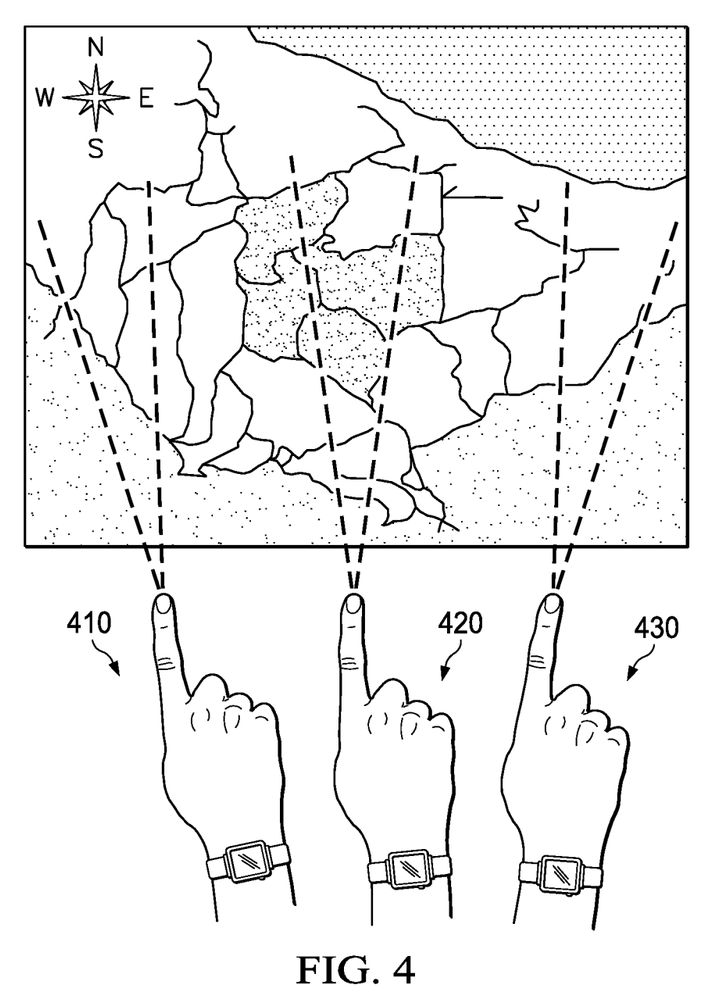
FIG. 4 is illustration of an electronic map onto which is displayed orientation of a plurality of pointing gestures in accordance with an illustrative embodiment.

FIG. 4 depicts an electronic map onto which is displayed orientation of a plurality of pointing gestures in accordance with an illustrative embodiment. As shown in the figure, user 410 wearing smart watch 130 of FIG. 3 points to a direction in the horizon. Compass 340 of FIG. 3 in smart watch 130 determines the direction as being north-north-east (NNE). Consequently, a NNE direction is indicated on the map. Likewise, compass 340 in smart watches 130 worn by user 420 and user 430 determines that user 420 and user 430 are pointing to a north (N) and a north-north-west (NNW) direction, respectively. Hence, these directions are shown on the map.

The other analysis is performed to determine whether the movement of the arm is a pointing gesture and the distance of the area to which the person wearing smart watch 130 is pointing. In accordance with the disclosure, smart watch 130 uses accelerometer sensor 324 and gyroscope sensor 322, shown in FIG. 3, to detect at what angle the user is pointing. The angle at which the user is pointing indicates the relative distance of the point in the horizon to which the user is pointing (e.g., whether the point is near-field, mid-field, or far afield etc.). In addition to considering the angle, the movement of the pointing gesture is also considered to determine whether the arm movement is a pointing gesture. For example, a user pointing upward and moving their arm in a throwing gesture maybe interpreted as a pointing gesture, as well as recorded as pointing at an area in the far distance.

Figure 5:
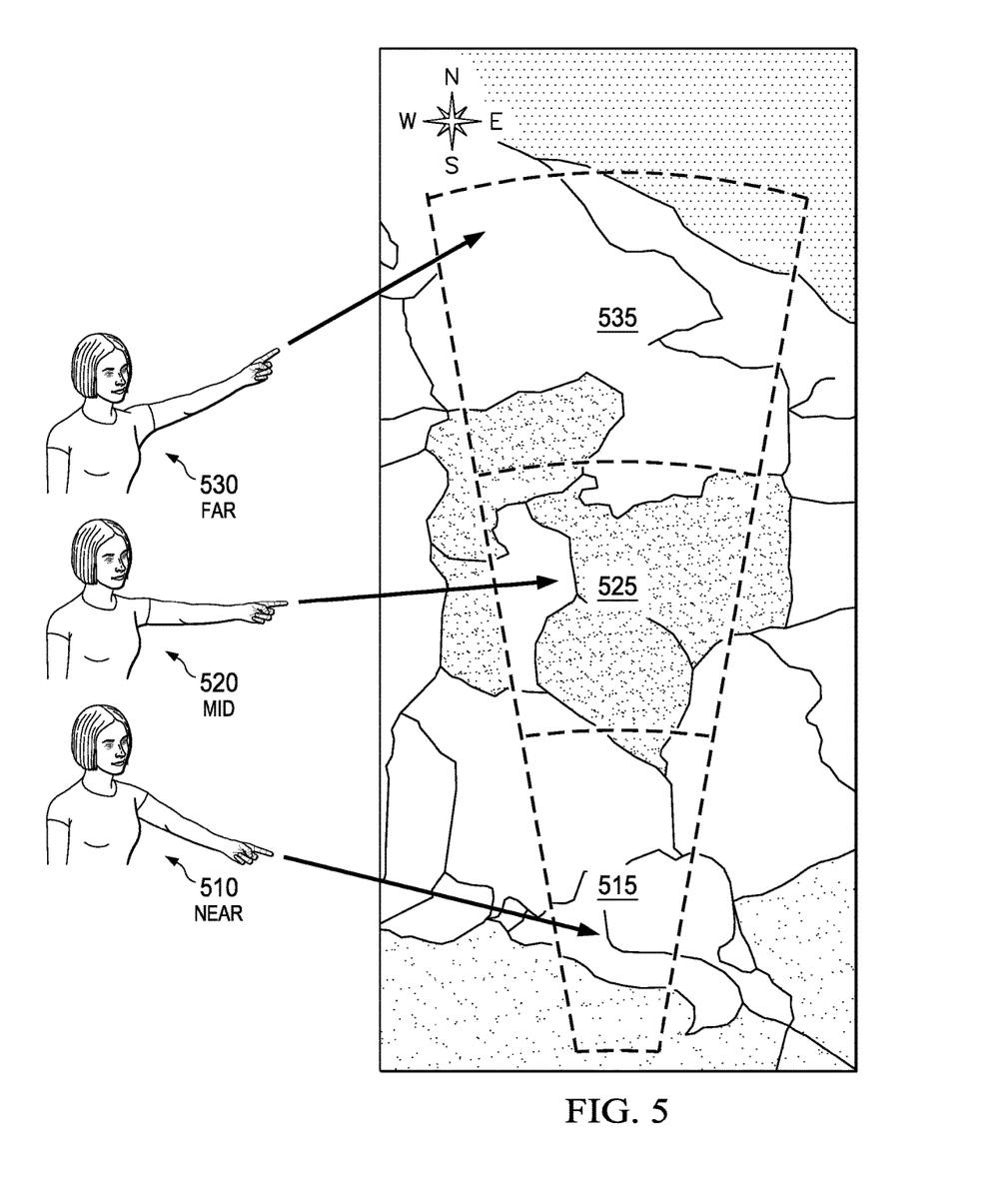
FIG. 5 is an illustration of correlations between angles of pointing gestures and relative distances of areas being pointed to by a user wearing a smart watch in accordance with an illustrative embodiment.

FIG. 5 illustrates correlations between angles of pointing gestures and relative distances of areas being pointed to by a user wearing a smart watch in accordance with an illustrative embodiment. The smart watch may be smart watch 130 of FIG. 1 and FIG. 3. The angles may be measured from the body of the user (or a position of rest) to the pointing arm of the user (i.e., the arm on which smart watch 130 is being worn). As illustrated in the figure, the angle formed by the body and pointing arm of user 510 is relatively small. Hence, smart watch 130 interprets the distance from the user as being relatively short as illustrated by area 515. The angle formed by the body and pointing arm of user 520 is larger than that formed by the body and pointing arm of user 510. Thus, area 525 pointed to by user 520 is shown to be further away than area 515. The angle formed by the body and pointing arm of user 530 is the largest of the three angles, and thus area 535, being pointed to by user 530, is shown to be further away than both areas 515 and 525.

Figure 6:
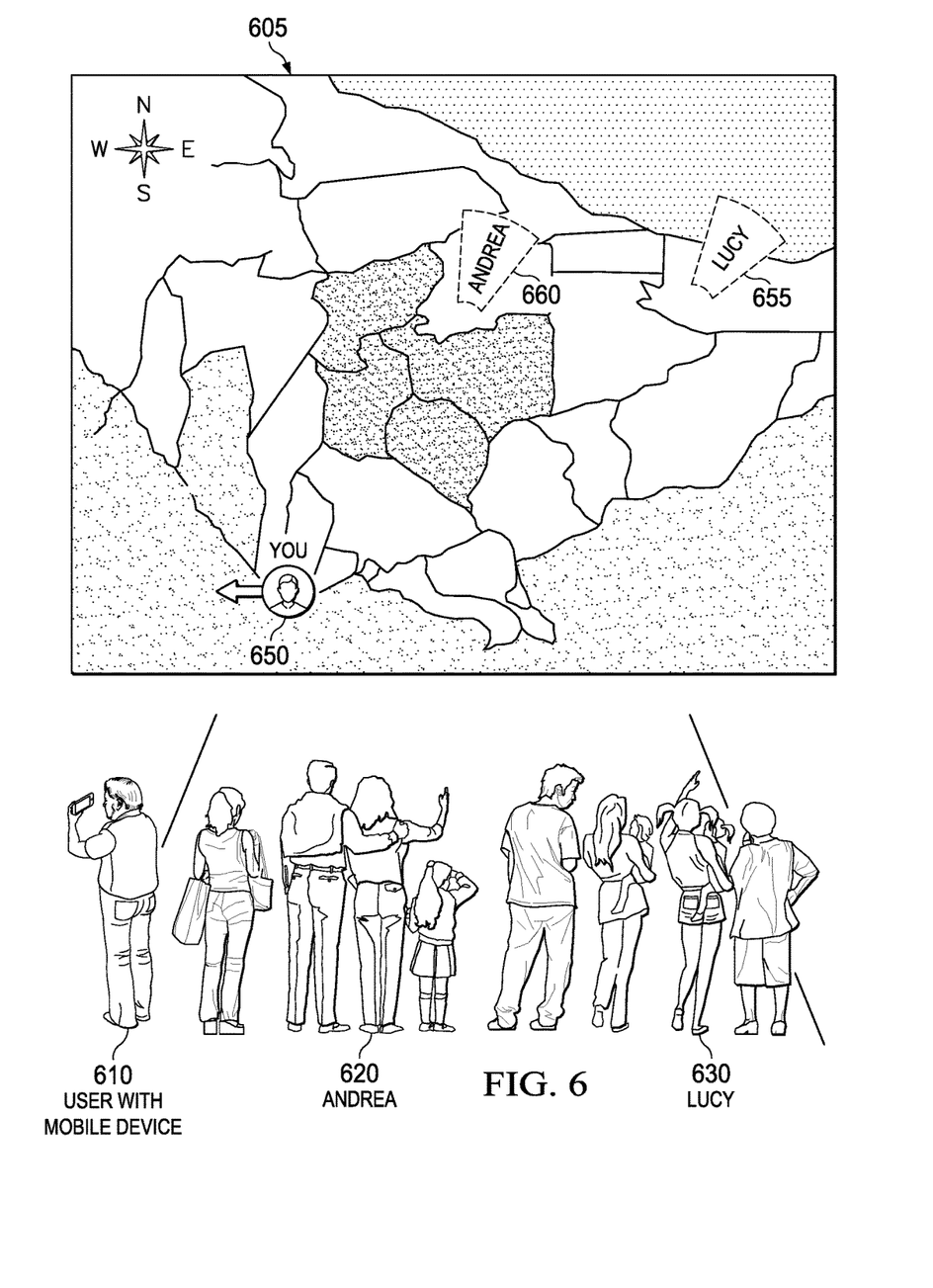
FIG. 6 is an illustration of an exemplary electronic map showing position and orientation of a user of a mobile device and areas to which two smart watch users are pointing in accordance with an illustrative embodiment.

FIG. 6 depicts an exemplary electronic map showing position and orientation of a user of a mobile device and areas to which two smart watch users are pointing in accordance with an illustrative embodiment. Shown in the figure is a group of users or friends or hikers. Hiker 610 is holding a mobile device (e.g., cell phone 110) onto which electronic map 605 of hiking trails is displayed. Two other hikers (hiker 620 and hiker 630), wearing each a smart watch 130 of FIG. 1 and FIG. 3, are pointing at areas and/or trails in the distance. According to the disclosure, each smart watch 130 determines the area where the hiker wearing the watch is pointing and sends the location of the area to the mobile device to be rendered onto electronic map 605. This enables the hiker holding the mobile device to determine at a glance the hiker's own position and orientation 650 as well as area 660 to which hiker 620 is pointing and area 655 to which hiker 630 is pointing. Hiker 610 may then scrutinize areas 655 and 660 on the map to determine what hiker 620 and hiker 630 are pointing to or whether there are sites or points of interest worth exploring etc. in those areas.

In an alternative embodiment, instead of using smart watches 130 to detect pointing gestures, camera 265, shown in FIG. 2, along with a plurality of applications may be used to do so. Particularly, the user of cell phone 110 may capture a picture of a person with a pointing arm with camera 265. After capturing the picture of the person with the pointing arm, a facial recognition application that may be running in the background on cell phone 110 may be used to determine who the person is. In this case, the facial recognition application may compare the captured picture of the person with pictures of friends of the user of cell phone 110 from social network websites, such as Facebook, Linkedin, message applications, or any application in which pictures of the friends of the user may be found in order to determine the identity of the person. Another application may use compass 215, shown in FIG. 2, along with the captured picture to determine in which direction the raised arm of the person is pointing. The application may also use GPS receiver 250, shown in FIG. 2, along with the angle of the raised arm to determine where in the horizon the person is pointing. Cell phone 110 may then augment the displayed electronic map by displaying the name of the person and the area on the map where the person is pointing. In cases where the facial recognition application was not able to figure out who the person is, then only the area to which the person points may be displayed on the electronic map.

Figure 7:
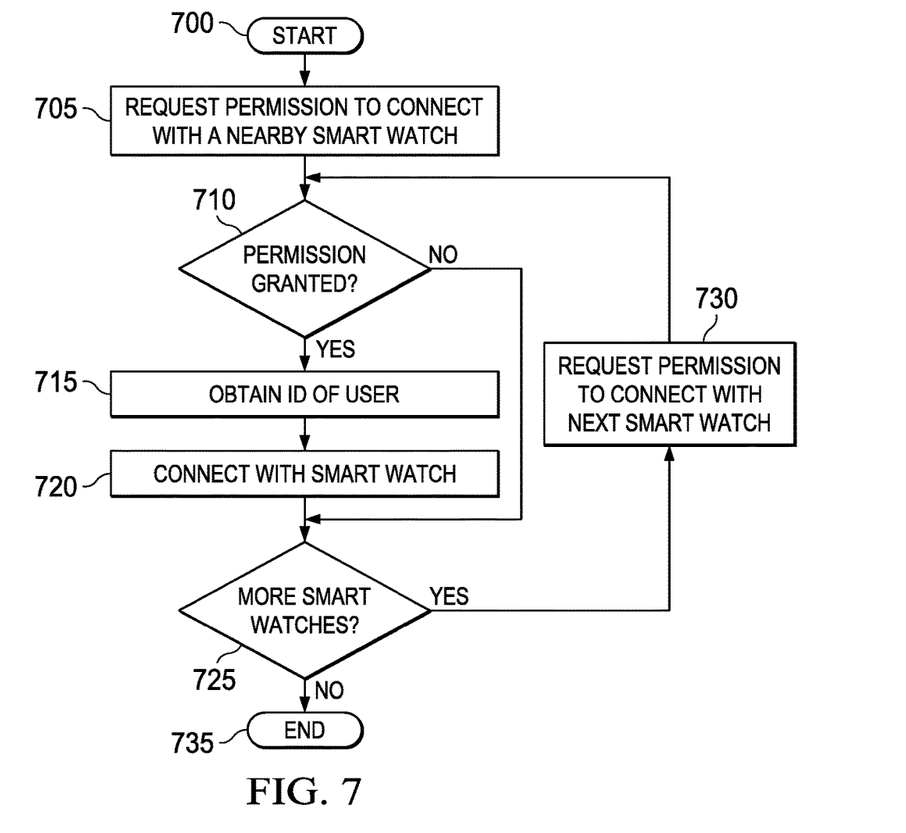
FIG. 7 is a flowchart of a process that may be used by a mobile device to connect with nearby smart watches, according to an embodiment.

FIG. 7 is a flowchart of a process that may be used by a mobile device to connect with nearby smart watches in accordance with an illustrative embodiment. The process starts when the user of the mobile device launches connect application 238 of FIG. 2 on the mobile device (block 700). At that point, the mobile device issues a request permission to connect with a nearby smart watch (block 705). Note that the strength of the signal of the nearby smart watches may be used to determine in which order the permission request is sent to the smart watches when there is more than one smart watch.

In any event, after sending the permission request, the mobile device determines whether permission to connect is granted by the user of the smart watch (block 710). If the user of the smart watch grants the permission, the mobile device obtains the identification of the user of the smart watch (block 715) and connects with the smart watch (block 720). The identification of the user may be from the profile of the user as found from the smart watch. For example, certain mobile devices (e.g., Iphone, Ipad, etc) usually states to whom the mobile device belongs in a profile. This may be used to identify the user as an example. As alluded to above, the type of connection made (i.e., whether it is a Bluetooth, Wi-Fi peer-to-peer, or ultrasound connection etc.) may be based on the distance between mobile device 110 and the smart watch 130 in question, both shown in FIG. 1.

If the user of the smart watch does not grant the permission, the process jumps to bock 725. At block 725, the mobile device determines whether there are more smart watches with which to connect. If so, the mobile device request permission to connect with the next smart watch (block 730) and returns to block 710. If there is not at least one more smart watch with which to connect, the process ends (block 735).

Figure 8:
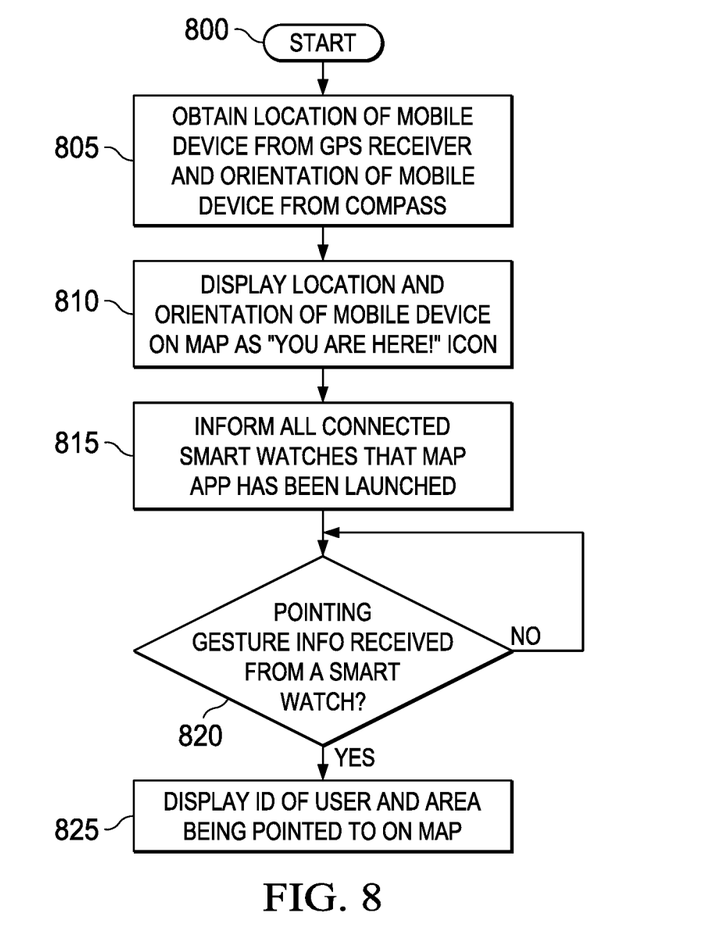
FIG. 8 is a flowchart of a process that may be used by a mobile device to display information on an electronic map in accordance with an illustrative embodiment.

FIG. 8 is a flowchart of a process that may be used by a mobile device to display information on an electronic map in accordance with an illustrative embodiment. The process starts when the user of the mobile device launches map application 236 of FIG. 2 on the mobile device (block 800). Once the map application 236 is launched, the process obtains the location of the mobile device from GPS receiver 250 and the orientation of the mobile device from compass 215 (block 805). The process then displays the location and orientation of the mobile device as a "You Are Here!" icon on the electronic map (block 810) and inform all connected smart watches that the map application 236 has been launched (block 815). After doing so, the process waits to receive pointing gesture information from the connected smart watches (block 820). When the process receives a pointing gesture information from a smart watch, the process displays the identification of the user of the smart watch that sends the information as well as the area that the user is pointing to on the electronic map (block 825) as determined from the received pointing gesture information. The process ends when the map application 236 is closed. Once that occurs, the mobile device may inform the connected smart watches that the map application 236 is closed and/or disconnect from the smart watches.

Figure 9:
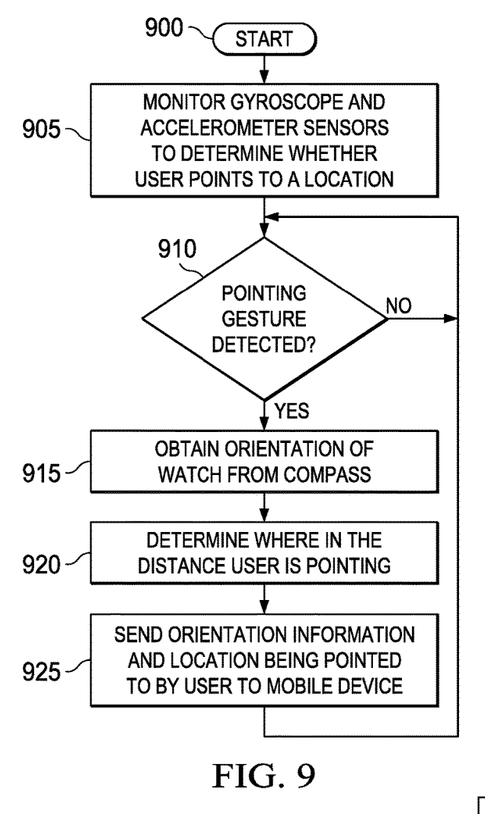
FIG. 9 is a flowchart of a process that may be used by a smart watch to send pointing gesture information to a mobile device that is displaying an electronic map and with which the smart watch is connected in accordance with an illustrative embodiment.

FIG. 9 is a flowchart of a process that may be used by a smart watch to send pointing gesture information to a mobile device that is displaying an electronic map and with which the smart watch is connected in accordance with an illustrative embodiment. The smart watch may be smart watch 130 of FIG. 1 and FIG. 3. The mobile device may be cell phone 110 of FIG. 1. The process starts when smart watch 130 is informed that the user of mobile device has launched the map application 236 of FIG. 2 (block 900). At that point, the process begins to monitor gyroscope sensor 322 and accelerometer sensor 324 of FIG. 3 to detect whether the user of the smart watch is gesturing or pointing to a location in the distance (block 905). The process waits at block 910 to detect the pointing gesture. If a pointing gesture is detected the process continues on to block 915 to obtain orientation information from compass 340 and to block 920 to determine where in the distance the user is pointing. If a pointing gesture is not detected, the process waits at block 910 until a pointing gesture is detected. Once the process determines where in the distance the user is pointing (block 920), the process sends the orientation information as well as information regarding where in the distance the user is pointing to the mobile device (block 925) before the process returns to block 910 to wait for more pointing gestures from the user. The process ends when the process is informed by the mobile device that map application 236 of FIG. 2 has been closed and/or when the smart watch is disconnected from the mobile device.

Figure 10:
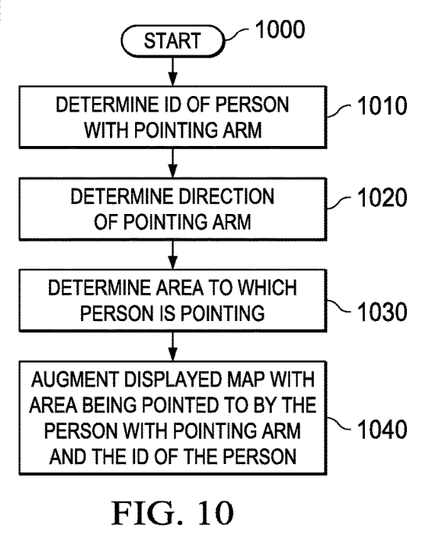
FIG. 10 is a flowchart of an alternative process that may be used to augment a displayed electronic map in accordance with an illustrative embodiment.

FIG. 10 is an alternative process that may be used to augment a displayed electronic map is depicted in accordance with an illustrative embodiment. The process starts when the user of the mobile device captures a picture of a nearby person with a pointing arm while the electronic map is being displayed on the mobile device (block 1000). Upon capturing the picture of the person, the process determines the identity of the person whose image is captured (block 1010), determines the direction of the pointing arm (block 1020) and determines the area to which the person is pointing (block 1030). After doing so, the process augments the displayed electronic map by displaying onto the displayed electronic map the area being pointed to by the person as well as the identity of the person when it is known (block 1040). The process ends when map application 236 of FIG. 2 is closed.

Note that depending on the implementation, the mobile device may continue to display a previous area that a user was pointing to while displaying a new area being pointed to by the user. Alternatively, the mobile device may replace the previous area with the new area.

The present invention may be a system, a method, and/or a computer program product at any possible technical detail level of integration. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing devices. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing devices. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function or act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions or acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, a segment, or a portion of instructions, which comprises one or more executable instructions for implementing the specified logical function or functions. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method performed by an electronic device of augmenting an electronic map with pointing gestures, comprising:
    sending, by the electronic device, a signal to a smart watch to inform the smart watch to launch a detection application;
    displaying, by the electronic device, an electronic map of a current location of a user of the electronic map;
    receiving, by the electronic device, an indication (i) that a person nearby to the user is gesturing and (ii) of an area toward which the person is gesturing; and
    augmenting, by the electronic device responsive to receiving the indication, the electronic map by displaying an area toward which the person is gesturing on the electronic map, wherein the indication is from the smart watch.

2. The computer-implemented method of claim 1, wherein the indication includes an orientation of the smart watch.

3. The computer-implemented method of claim 2, wherein the indication further includes a relative distance of the area from the user.

4. The computer-implemented method of claim 3, wherein the indication further includes an identity of the person.

5. The computer-implemented method of claim 4, wherein the identity of the person is also displayed on the electronic map.

6. A system for augmenting an electronic map with pointing gestures, comprising:
    at least one storage device to store code data; and
    at least one processor for processing the code data to:
        display an electronic map of a current physical location of a user of the electronic map using the current physical location of the user,
        receive an indication that a person nearby to the user is gesturing, and
        augment the electronic map by displaying an area toward which the person is gesturing on the electronic map.

7. A system for augmenting an electronic map with pointing gestures, comprising:
    at least one storage device to store code data; and
    at least one processor for processing the code data to:
        display an electronic map of a current location of a user of the electronic map,
        receive an indication that a person nearby to the user is gesturing, and augment the electronic map by displaying an area toward which the person is gesturing on the electronic map, wherein the indication is from a smart watch.

8. The system of claim 7, wherein the indication includes an orientation of the smart watch.

9. The system of claim 8, wherein the indication further includes a relative distance of the area from the user.

10. The system of claim 9, wherein the indication further includes an identity of the person.

11. The system of claim 10, wherein the identity of the person is also displayed on the electronic map.

12. A computer program product for augmenting an electronic map with pointing gestures, the computer program product comprising a computer-readable storage medium having program instructions embodied therewith, the instructions executable by a processor to cause the processor to:
 display an electronic map of a current physical location of a user of the electronic map using coordinates indicating the current physical location of the user;
 receive an indication that a person nearby to the user is gesturing; and
 augment the electronic map by displaying an area toward which the person is gesturing on the electronic map.

13. A computer program product for augmenting an electronic map with pointing gestures, the computer program product comprising a computer-readable storage medium having program instructions embodied therewith, the instructions executable by a processor to cause the processor to:
 display an electronic map of a current location of a user of the electronic map;
 receive an indication that a person nearby to the user is gesturing; and
 augment the electronic map by displaying an area toward which the person is gesturing on the electronic map, wherein the indication is from a smart watch.

14. The computer program product of claim 13, wherein the indication includes an orientation of the smart watch.

15. The computer program product of claim 14, wherein the indication further includes a relative distance of the area from the user.

16. The computer program product of claim 15, wherein the indication further includes an identity of the person.

17. The computer program product of claim 16, wherein the identity of the person is also displayed on the electronic map.

18. A computer-implemented method of augmenting an electronic map with pointing gestures, comprising:
 detecting, by a smart watch, that a user initiates a pointing gesture toward an area being pointed at by the user;
 in response to detecting that the user initiates the pointing gesture, determining, by the smart watch, a direction of the pointing gesture and a distance from the user to the area being pointed at by the user;
 displaying, by a mobile device, an electronic map of a current physical location of the user of the electronic map using coordinates indicating the current physical location of the user;
 receiving, by the mobile device, an indication that a person nearby to the user is gesturing; and
 augmenting, by the mobile device responsive to receiving the indication, the electronic map by displaying an area toward which the person is gesturing on the electronic map, wherein the detecting, the direction determination and the distance determination are performed by the smart watch, and the displaying, the receiving and the augmenting are performed by the mobile device operatively coupled to the smart watch via a network.

19. The computer-implemented method of claim 18, wherein the network uses a Wi-Fi peer-to-peer connection to directly communicate between the smart watch and the mobile device without use of an intervening device.

* * * * *